July 25, 1944.  W. F. MacGREGOR  2,354,346
COMBINATION HARVESTER THRESHER
Filed Feb. 12, 1940  6 Sheets-Sheet 1

Fig. 1

INVENTOR.
WALLACE F. MacGREGOR, DECEASED,
RICHARD D. MILLER & E.B. HAND, ADMINISTRATORS,
BY
Emerson B. Donnell,
ATTORNEY.

July 25, 1944.  W. F. MacGREGOR  2,354,346
COMBINATION HARVESTER THRESHER
Filed Feb. 12, 1940  6 Sheets-Sheet 2

Fig 2

INVENTOR.
WALLACE F. MACGREGOR DECEASED
RICHARD D. MILLER & E. B. HAND, ADMINISTRATORS,
BY
Emerson B. Donnell,
ATTORNEY.

Fig 3

July 25, 1944. W. F. MacGREGOR 2,354,346
COMBINATION HARVESTER THRESHER
Filed Feb. 12, 1940 6 Sheets-Sheet 5

INVENTOR.
WALLACE F. MacGREGOR, DECEASED,
RICHARD D. MILLER & E.B. HAND, ADMINISTRATORS,
BY
Emerson B. Donnell,
ATTORNEY.

Patented July 25, 1944

2,354,346

UNITED STATES PATENT OFFICE 2,354,346

COMBINATION HARVESTER-THRESHER

Wallace F. MacGregor, deceased, late of Racine, Wis., by Richard D. Miller and E. B. Hand, administrators, Racine, Wis., assignors to J. I. Case Company, Racine, Wis., a corporation Application February 12, 1940, Serial No. 318,504

4 Claims. (Cl. 56—122)

The present invention relates to combination harvester threshers commonly known as "combines," and particularly to the general purpose type adapted for harvesting grain, beans, peas, and other crop growths, and which may be readily transported and operated by a tractor, and an object of the invention is to generally improve the construction and operation of devices of this class.

A further object is to provide a machine of this character limited in size and capable of efficient operation with a minimum of manual attendance.

Further objects are to provide improvements in the draft mechanism of such combines whereby the combine may be made to trail in different lateral relations to the tractor; improved mechanism for filling and emptying the bin on a combine; improved means for feeding material from the cutting mechanism to the cylinder; improved means for eliminating undesirable seeds from the cleaned grain; improvements in the construction of parts of the conveying mechanism, and improvements in the construction of a reel for a combine.

Other objects and advantages will be apparent from the attached specification and accompanying drawings in which:

Fig. 10ª is a sectional view taken on the line 10ª—10ª of Fig. 10.

Figure 14:
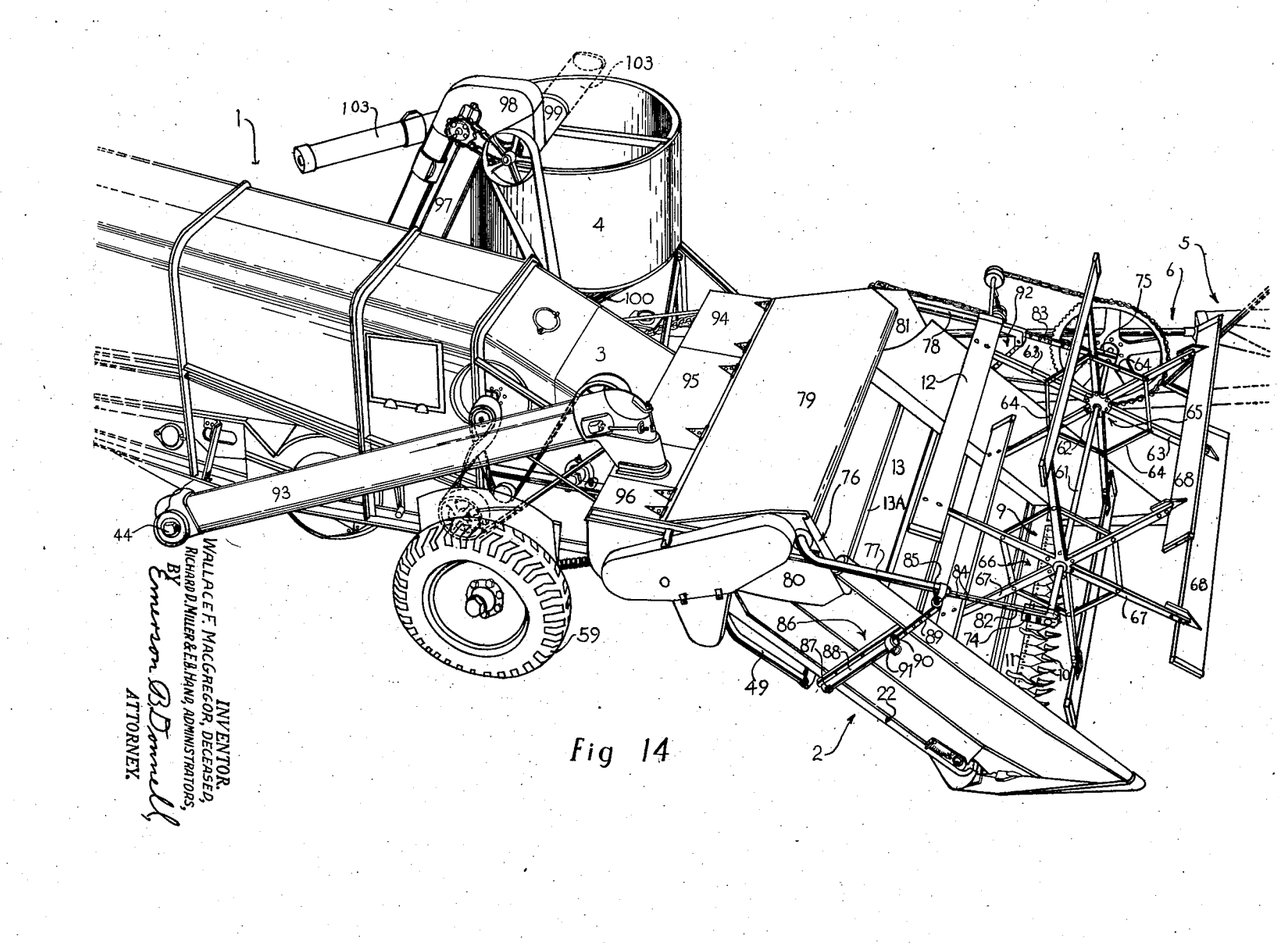
Fig. 14 is a perspective view of the entire machine.

As seen in Fig. 14, the combine illustrative of the invention includes a body portion 1, consisting of a header 2, a thresher 3, a grain container or bin 4, and a draw bar and accompanying mechanism 5, the whole being drawn by a tractor not shown, and actuating the mechanism of the combine through a power take-off, generally designated as 6.

The whole operates generally in a manner common to these machines, namely, that the tractor draws the combine through the field in a laterally offset position while operating the mechanism through the power take-off 6, while the header 2 cuts the grain which travels directly to the rear of the header and into and through the threshing mechanism 3, the clean grain being deposited in bin 4 and the straw or vines being discharged at 7 (Fig. 1), onto the ground. For transportation a draw bar element 8 may be swung to the position shown in dotted lines in Fig. 3 for narrowing the tread of the complete outfit, to comply with the usual restrictions for travel on the highway.

Returning to a detailed description of the mechanism, header 2 comprises a cutter bar of suitable construction generally designated as 9, including a plurality of guards 10—10 and a sickle 11. Sickle 11 is reciprocated in a manner to be later described for the purpose of cutting the grain or vines which are directed by a reel, generally designated as 12 (see also Fig. 1), onto a draper, canvas, or conveyor 13, the conveyor running about a lower roller 14, Fig. 1, and conveying the cut material rearwardly and upwardly toward the threshing mechanism. At its upper end conveyor 13 passes over a roller 15 and material on the conveyor is compacted by a second conveyor or draper 16, generally above roller 15 and running over rollers 17 and 18. The crop is therefore cut and laid back on the canvas in a thin even layer, the full width of the canvas, and proceeds up toward the threshing mechanism without any substantial change in direction.

Figure 1:
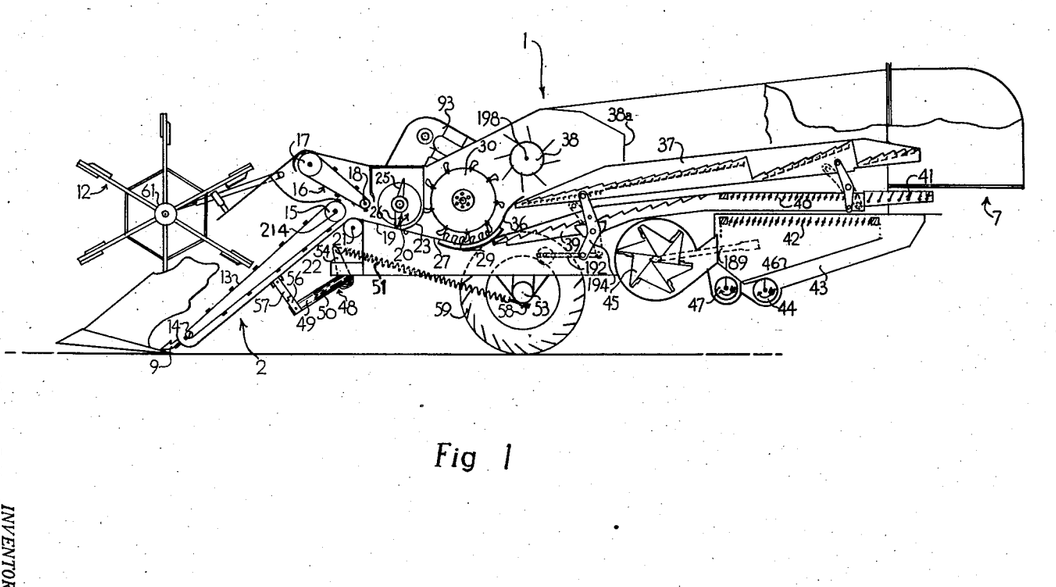
Figure 1 is a longitudinal vertical sectional view of a combine embodying the invention.

At the top of canvas 13, the material is directed downwardly onto a floor or platform 19, over which it slides into a combined auger and beater member, generally designated as 20. In order to assist in this action and to prevent back feeding beneath canvas 13, a roller 21 may be positioned beneath and preferably beyond above mentioned roller 15 if desired. Roller 21 rotates clockwise, as seen in Fig. 1, to oppose any material tending to be carried entirely around roller 15 and between the returning run of canvas 13 and deck 22 of header 2.

Auger member 20 rotates counter-clockwise in a trough or chamber 23, and has a center section 24 comprising beater paddles 25 and 26. Material at the mid portion of canvas 13 is accordingly engaged by these paddles and impelled rearwardly across a panel 27 extending from an opening 28 (Fig. 3) in the rear of trough 23 to the front portion of a concave unit 29. Above unit 29, a cylinder generally designated as 30 operates in well-known manner, rotating counter-clockwise, as seen in Fig. 1, and drawing material from panel 27 between itself and concave 29.

Figure 3:
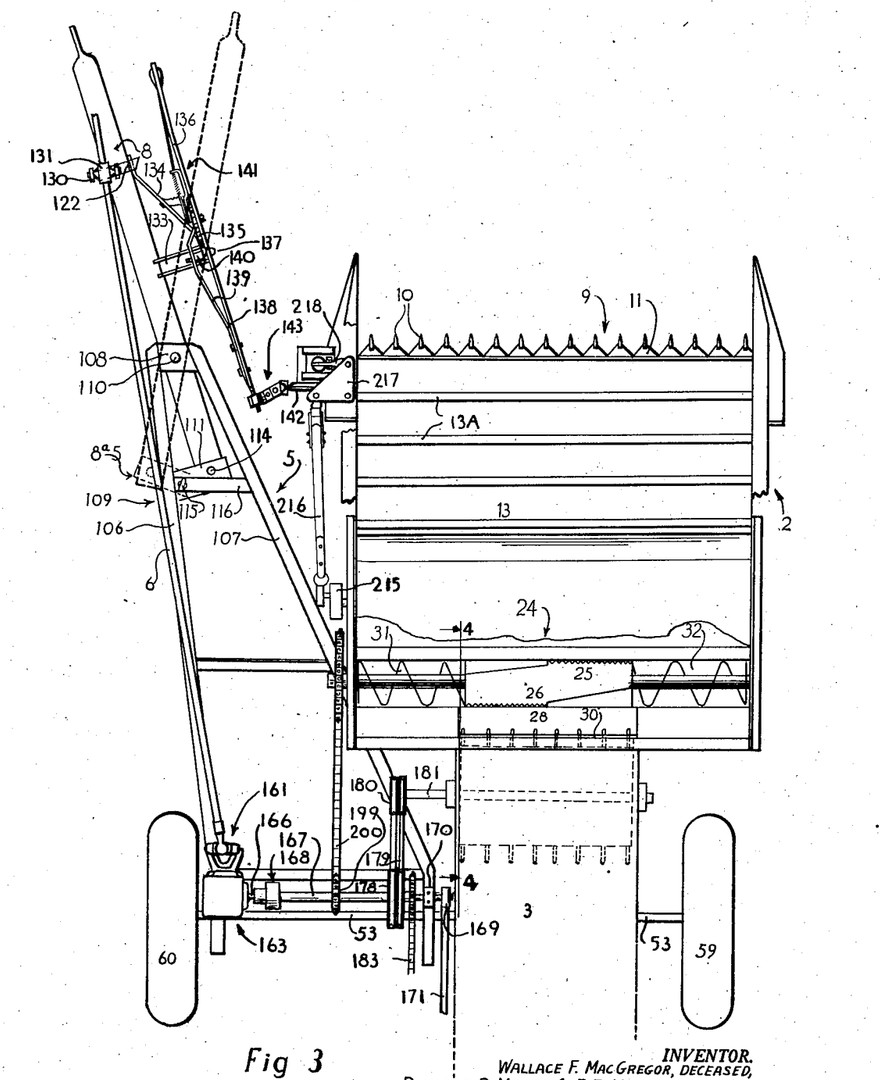
Fig. 3 is an enlarged plan view of a portion of the machine.
Figure 4:
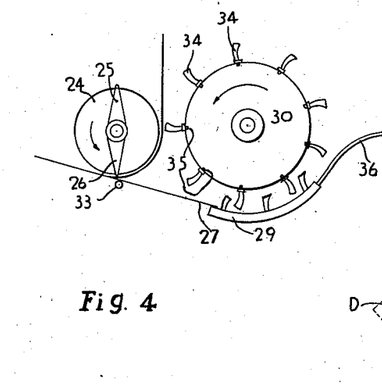
Fig. 4 is a vertical sectional view on the line 4—4 of Fig. 3.

Opening 28, Fig. 3, and cylinder 30, in the present illustrative embodiment, are not the full width of canvas 13, and accordingly material spread in the above mentioned thin layer across said canvas must be consolidated for passage through opening 28. For this purpose a short auger portion 31, in the present instance having a "right hand" lead, is arranged as an extension of beater 24 at the left end thereof, while a similar extension portion 32, but having a "left hand" lead is arranged at the right end of beater 24. Rotation of this assemblage will accordingly draw material from the left side of canvas 13 toward the beater, while the auger portion 32 will draw material from the right side of canvas 13 toward the beater, whereby all the material coming from sickle 9 will be directed into opening 28 and cylinder 30.

Cylinder 30 includes a plurality of cylinder teeth 34—34 held on the cylinder by suitable fastening means as 35—35 or other well-known threshing elements such for example as rasp bars not shown, which normally move at a relatively high speed.

Beyond concave 29, a series of fingers 36 permit the escape of threshed kernels and conduct the straw upwardly onto a straw rack 37, which may be of suitable or well-known construction. A beater 38 acts to compact the straw and other material and to urge it downwardly and rearwardly onto rack 37. Any flying kernels or the like are intercepted by a check flap 38ª movably suspended in range of such material, but which may be readily pushed out of the way by the straw if the volume thereof requires the extra space.

Kernels escaping between fingers 36 and dropping through straw rack 37 are collected on a grain pan 39 and urged rearwardly to a chaffer sieve 40, having a tailings section 41, the grain falling through chaffer sieve 40 to a cleaning sieve 42, and the tailings falling through section 41 and a passageway 43 to tailings auger 44. A blast of air is supplied by a fan 45 and directed upwardly through sieves 42, 40 and 41, carrying the chaff outwardly through opening 7, while the clean grain drops through sieves 40 and 42 to a pan 46 and gravitates to a clean grain auger 47.

Straw rack 37, grain pan 39, and sieves 40, 41 and 42 are given a shaking motion by mechanism to be presently described. This completes the course of the crop material through the machine.

For gathering crops at different heights, header 2 is adjustable, being pivoted to body portion 1 on the axis of roller 15. Swinging of the header up and down accordingly does not disturb the relation between roller 15 and upper canvas 16. The header is counterbalanced by a bifurcated brace member 48, extending beneath the header and pivoted at the front of body portion 1. Member 48 includes arms 49 and 50 which are urged upwardly by counterbalancing springs as 51 anchored to an axle 53 or other convenient portion of the combine and pulling rearwardly against arms as 54, fixed with above mentioned arms 49 and 50. The latter arms are connected with the under side of header 2 as by links or compression members 56 and 57. The tension of springs 51 may be regulated, as for example by any suitable adjusting means 58 so that the weight of header 2 may be substantially balanced by the upward thrust of arms 49 and 50. Header 2 will accordingly "float" over the ground with a minimum pressure thereon.

Axle 53 carries wheels 59 and 60 for supporting the combine, and carrying it over the ground. As will be apparent, the machine is substantially balanced over axle 53 and needs only to be steadied by the connection of the draw-bar with the tractor.

Figure 5:
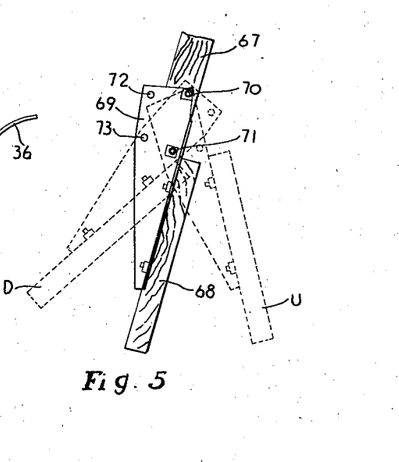
Fig. 5 is an end view of a portion of a reel indicated in Fig. 14.

Reel 12 is supported for adjustment in its relation to cutter bar 9 and comprises a shaft 61, Fig. 14, having a spider 62 carrying outwardly extending arms 63—63 spaced by braces 64—64, the whole constituting a support generally designated as 65. A similar support 66 is disposed at a point spaced from support 65 and has arms 67—67, the corresponding arms of the respective supports being connected by bats 68—68 which engage the crop for urging it into contact with cutter bar 9 and laying it on the canvas 13. As seen in Fig. 5, bats 68 are adjustably connected to the arms by means of fittings, plates, clamps or the like 69—69, bolts or other suitable fastening means 70, 71, extending through the arms and plates and holding the plates rigidly on the arms.

Suitable means is provided for shifting the plates with relation to the arms as holes 72 and 73. Thus for tilting the bats to tend to press the crop down, bolts 70 are removed and replaced through the arms and holes 72, first bringing holes 72 into registration with the disclosed location of bolts 70. The bats will then be in the dotted position D. For tilting the bats for lifting a crop, bolts 71 are removed and holes 73 brought into registration with the arms and the bolts replaced, whereupon the bats will be in the dotted position U. It will be understood that this structure is duplicated for each bat.

Shaft 61 is carried in bearings 74 and 75, Fig. 14, supported from the header as follows: A yoke 76 having arms 77 and 78 is extended across the header within a housing 79 enclosing above mentioned upper draper 16 and having end portions 80 and 81. Yoke 76 is preferably hollow, or otherwise formed to receive extensions 82 and 83 slidable in the arms 77 and 78, carrying above mentioned bearings 74 and 75. Suitable means as holes 84—84, engageable by pins or the like 85, are provided for longitudinal adjustment of the reel. Yoke 76 is journaled in housing 79 and by swinging therein provides for raising and lowering the reel.

Yoke 76 is maintained in any desired position above header 2 by a strut 86 pivoted to arm 77 adjacent to pin 85 and also to deck 22 at 87. Strut 86 comprises a tubular or other suitable portion 88 having slidably arranged therein, a bar 89, suitable adjusting means being provided as holes 90 engageable by a pin 91 or other suitable locking means. A similar strut 92 is provided, pivoted to arm 78 in a similar manner.

It will be noted that since yoke 78 is pivoted in housing 79, and supported from deck 22, that adjustments of header 2 will cause substantially corresponding movements of yoke 76 and accordingly reel 12. Any desired relation between the reel and cutter bar 9, can be readily obtained by adjusting elements 82 and 83 and adjustable struts 86 and 92.

As seen in Fig. 14, tailings auger 44 projects on the right side of the machine and delivers into an elevator 93 of any suitable or preferred construction which returns the tailings to auger section 32, the combined beater and auger element as seen in Fig. 14 being covered by a series of closure elements 94, 95 and 96, which are preferably hinged or otherwise readily removable for inspection of the beater element.

Grain auger 47 connects with an elevator 97 of any suitable or well-known type, adapted to deliver through a chute or housing 98 into an auger conveyor 99, extending over above mentioned bin 4. Actuation of augers 47 and 99 and elevator 97 will accordingly transport cleaned grain from the bottom of the threshing portion into the bin for filling the same. Much of this same apparatus is used for emptying the bin.

Figure 2:
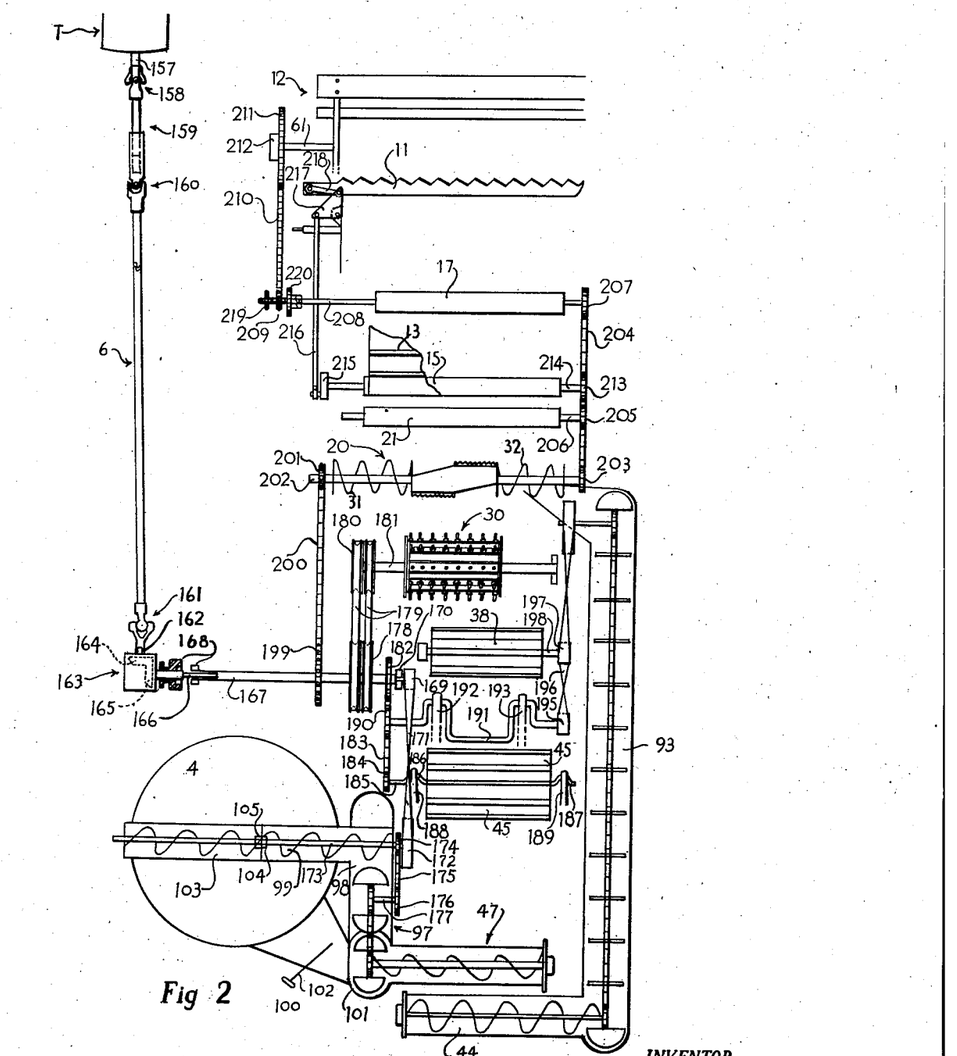
Fig. 2 is a view in the nature of a diagram, showing the drives to the various parts and the manner in which they cooperate in the operation of the machine.

For this purpose a connection in the form of a chute, pipe or the like 100, extends from the bottom of bin 4 into a housing 101, Fig. 2, at the foot of elevator 97, a slide, valve or the like 102 normally closing the passageway through chute 100. By withdrawing the slide, grain may be admitted from bin 4 into elevator 97 from which it will be delivered in the above described manner to auger 99. Auger 99 has an extension 103, Figs. 2 and 14, which is hinged to or otherwise readily removable from auger 99. When bin 4 is to be emptied, extension 103 is fitted on auger 99, the combined structure extending completely across bin 4, as suggested in dotted lines, to a suitable discharge point beyond the bin. Auger 99 has a clutch portion 104 which engages a complementary clutch portion 105 in extension 103 when the extension is applied and through which the latter is driven by auger 99. Means is provided for actuating auger 47, elevator 97 and auger 99 independently of the balance of the combine as will appear.

Draw bar 8 includes an outer member 106, Fig. 3, extending forwardly from axle 53 and joined therewith at a point adjacent stubble wheel 60. Another member 107 extends forwardly from beneath body portion 1 and connects with a pivot or fulcrum support or box 108, both members 106 and 107 being offset, in the present instance to the left of the direction of travel of the combine. Member 106 is slotted backwardly from pivot support 108 to about the point 109, to permit the projection of above mentioned member 8. Member 8 is, conveniently formed of a heavy tubular element and fulcrumed on a pin or the like 110, carried in above mentioned pivot support 108 for swinging movement either in line with the general direction of draw bar 8 or transversely thereto, as shown in dotted lines for bringing the machine more nearly into trailing relation with the tractor as above explained. When so positioned, the rear end 8ª of member 8, projects through above mentioned bifurcated member 106. Suitable means is provided for maintaining member 8 in desired position. In the present instance a bale 111, or similar element, having extremities 112 and 113, Fig. 6, between which portion 8ª is engaged and pivoted on a pin 114, is journaled adjacent its closed end on a removable pin 115 passing through a brace 116 fixed with members 106 and 107 and bale 111 for locking the latter relatively to draw bar 8.

Figure 6:
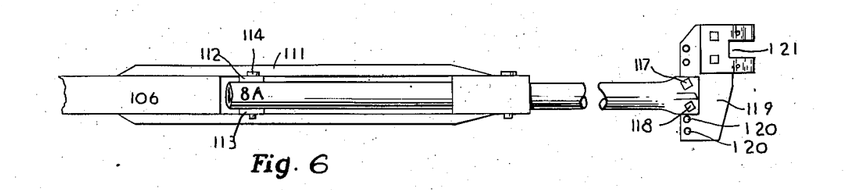
Fig. 6 is an enlarged detail elevation of certain mechanism indicated in Fig. 3.

In Fig. 6, bale 111 is positioned for holding member 8 in transport position and projects through the opening in member 106. By withdrawing pin 115, member 8 may be swung toward the position shown in Fig. 3, as by steering the tractor to the left, member 111 being free to pivot about the end of extension 8ª between members 106 and 107. When draw bar 8 has assumed the desired position, bale 111 may be secured, as shown in Fig. 3, by replacing pin 115. The parts may be restored to transport position by again withdrawing pin 115 and backing the tractor. The front of member 8 may be of any suitable construction, but in the present instance is flattened and bifurcated, as shown in Fig. 6, and fixed as by bolts 117 and 118 to a plate 119, having a series of holes 120—120 for the reception of bolts 117 and 118 to adjust the height of the plate. Any suitable coupling pin receiving element as 121 may be carried by the plate and through which arrangement a suitable coupling height may be obtained to carry the combine level with substantially any tractor.

Figure 7:
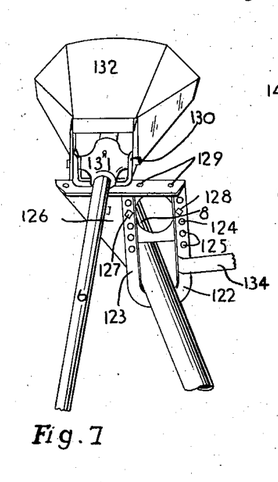
Fig. 7 is a perspective view of certain details indicated in Fig. 3.

As seen in Fig. 7, member 8 supports above mentioned power take-off shaft 6, a U shaped support 122 being welded or otherwise secured to member 8 and having its legs 123 and 124 perforated as at 125—125. A bracket or support 126 is fixed with the upstanding legs 123 and 124, as by bolts 127 and 128, for vertical adjustment relatively to support 122. Bracket 126 has an upper surface providing holes or the like 129—129, in which a suitable bolt or other fastening means associated with a support 130 may be engaged. Support 130 carries, for rocking movement therein, in any suitable manner, a bearing 131 in which is journaled above mentioned power take-off shaft 6. By selecting the most appropriate holes for bolts 127 and 128 and support 130, shaft 6 may be placed in the most advantageous position for operation from a power take-off, regardless of variations in the location of such power take-off on various tractors. A shield 132 may be supported in any suitable manner from above mentioned support 130 for protecting the operator or others from being injured by the rotating shafts.

Member 8 also supports regulating means for the adjustment of the height of header 2. A brace 133, Fig. 3, welded or otherwise suitably fixed with member 8 projects upwardly toward header 2. A member 134 may extend from the projecting extremity of brace 133 to above mentioned member 122 for further strengthening the structure. Brace 133 carries a quadrant 135 fixed therewith and a lever 136 is pivoted on quadrant 135 as by a pin 137 or the like, and has a rearward extension 138 projecting over a portion of header 2 to a point approximately in the transverse plane of above mentioned pivot 110.

Lever 136 is required to lock the header in adjusted position and, to make it rigid enough for this purpose, it has a brace portion 139 passing back of above mentioned brace 133 and contacting a spacer 140 rigidly fixed with the back of said brace. Pin 137 passes through lever 136, brace 133, spacer 140 and brace 139, the result being a very stable pivotal connection of the lever with brace 133. Lever 136 also has a clevis and latch mechanism of suitable or well known construction generally designated as 141.

Figure 8:
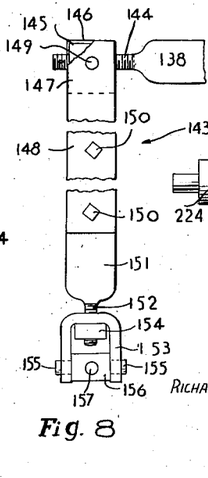
Fig. 8 is an enlarged elevation of certain mechanism indicated in Fig. 3.

Extension 138 of lever 136 is connected with a frame element 142, extending from and forming a part of header 2, by a pitman or like element generally designated as 143, but preferably rigid in character to prevent undesired upward movement of header 2. Member 143 may be of any suitable construction, but in the illustrative embodiment, as seen in Fig. 8, extension 138 in this instance is formed with a journal portion 144, extending into a block 145 held between the arms 146 and 147 of a bifurcated strap portion 148 by pintles as 149. Portion 148 is bolted or otherwise adjustably joined, as by bolts 150—150 to a strap portion 151 having a stem 152 passing through an inverted U shaped yoke 153, stem 152 being threaded and engaging a nut 154 within the yoke. Yoke 153 supports, as by pintles 155—155, a block 156 in which is journaled a portion 157 of above mentioned frame member 142. In this manner a rigid spacing of portion 144 and portion 157 and accordingly of lever 136 and header 2 is obtained, while relative rotary motion and misalignment necessary because of the arcuate paths of the two elements is provided. Other constructions of such elements as 143, however, are contemplated and the invention is not to be taken as limited by this description, or in fact in any manner except as defined in the claims.

This completes the description of the general constructional features of the machine, it being understood that frame members of suitable type may be and are included where necessary for making the machine stable and rigid, but such expedients being well-known to those skilled in the art, and not relating to the present invention it is not considered necessary to describe them further.

The drives for the various units originate in a power take-off shaft 157, Fig. 2, forming a part of tractor T, a universal joint generally designated as 158 transmitting the rotation to a spline shaft generally designated as 159, and shaft 159 transmitting the rotation through a universal joint 160 to above mentioned shaft 6. Shaft 6 extends backwardly along the draw bar to a universal joint 161 which drives a short shaft 162 extending into a gear box generally designated as 163. Gear box 163 contains suitable bevel gears 164 and 165 transmitting the rotation to a transverse shaft 166 having journaled thereon a sleeve 167. Suitable clutch means of well-known or other convenient type 168, is provided for clutching sleeve 167 with shaft 166 for rotation therewith.

Shaft 166, however, may rotate without driving sleeve 167 when clutch 168 is disengaged, and, to consider this situation first, shaft 166 rotates within sleeve 167 and actuates a pulley 169, the shaft being carried in a bearing 170 suitably supported on body portion 1.

Pulley 169 drives through a belt 171 or other flexible member, a pulley 172 on a shaft 173 extending from and driving above mentioned auger 99. A sprocket 174 on shaft 173 drives, through a chain or the like 175, a sprocket 176 fixed with a shaft 177 forming a part of and actuating above mentioned elevator 97 in well-known manner, elevator 97 driving above mentioned clean grain auger 47. The details of these units exclusive of the external drives being well known, no further description is considered necessary.

It will be noted that with the mechanism so far described, elevator 97 and auger 99 may be actuated without driving sleeve 167. The remainder of the machine being driven from said sleeve, it is possible to operate the elevator and discharge auger 99 for emptying bin 4 while the rest of the machine is at rest. While the bin is emptying, it is therefore possible to utilize the time to inspect, adjust or lubricate the machine as a whole without danger from the proximity of moving parts.

Sleeve 167 has fixed therewith a pulley or the like 178 actuating, through a plurality of belts or other flexible elements 179—179, a pulley or the like 180 on the axis or main shaft 181 of cylinder 30. Although any suitable rotative and connecting elements may be used, in the present instance V belts are contemplated and pulleys 178 and 180 are of any suitable type having adjustable flange spacing. By adjusting the flanges it is possible to obtain an adjustment of the cylinder speed to exactly suit various conditions. When a large change in speed is desired, for example in threshing peanuts, pulleys 178 and 180 may be exchanged for others of suitable sizes not shown to get the correct cylinder speed.

Sleeve 167 carries a sprocket 182 driving, through a chain or the like 183, a sprocket 184 on a shaft 185 carrying above mentioned fan 45, shaft 185 being offset or cranked at 186 and 187 and carrying pitmen 188 and 189 connected as shown in Fig. 1 for reciprocating cleaning shoe 46.

Chain 183, Fig. 2, also drives a sprocket 190 fixed with a crank shaft 191 and actuating through pitmen 192 and 193, bell cranks as 194—194, Fig. 1 connected in well-known manner for reciprocating straw rack 37 and grain pan or conveyor 39. These elements forming no part of the present invention need not be further described.

Crank shaft 191 carries a pulley or similar element 195 which drives, through a belt or the like 196, a pulley 197 on a shaft 198 forming the axis of above mentioned beater 38.

Sleeve 167 also carries a sprocket or similar element 199 driving, through a chain 200, a sprocket 201 on a shaft 202 forming the axis of above mentioned combination auger and beater 20. Shaft 202 extends through member 20 and carries a sprocket or like element 203 driving, through a chain 204, a sprocket 205 on a shaft 206 supporting and forming the axis of above mentioned stripper roller 21.

Chain 204 also drives a sprocket 207 on a shaft 208, forming the axis of above mentioned upper draper roller 17. Shaft 208 carries a sprocket 209 driving, through a chain 210, a sprocket 211 actuating, through a suitable or well-known type of overload release clutch generally designated as 212, above mentioned reel shaft 61.

Returning to chain 204 this element also drives a sprocket 213 on a shaft 214 which carries and drives above mentioned roller 15 for actuating draper or canvas 13. Shaft 214 also carries a crank 215 which drives a pitman 216 pivotally connected to a bell crank member 217 connected as by a link 218 to above mentioned sickle 11.

This completes the description of the drives to the various elements.

Figure 9:
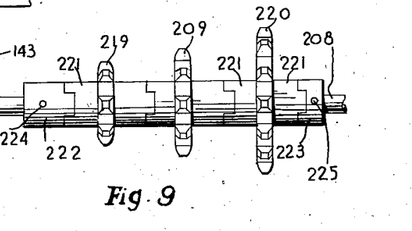
Fig. 9 is an enlarged plan view of certain sprockets indicated in Fig. 2.

Returning to the reel drive, various speeds for the reel are desirable, and for this purpose shaft 208 as shown in Fig. 9 carries a plurality of sprockets 219, 220 and above mentioned sprocket 209, the sprockets being arranged in line on shaft 208 and prevented from rotating relatively to each other by interfitting jaw clutch portions 221—221 which are preferably identical on all of the sprockets. Shaft 208 also carries collars 222 and 223, fixed therewith as by pins 224 and 225 and having jaw portions 221 identical with those on the sprockets. Sprockets 219, 209 and 220 are graduated in size to cover the desirable range of speed of reel 12 and may be rearranged on shaft 208 by withdrawing pin 224, removing collar 222 and arranging the desired sprocket in line with sprocket 211. Chain 210 is then applied to the desired sprocket, collar 222 and pin 224 being previously replaced, whereupon the desired speed will be obtained in shaft 61 and reel 12. Collars 223 and 222 drive the various sprockets through clutch portions 221, as will be apparent. Other interfitting means for driving the sprockets are contemplated as equivalent.

Figures 10, 10A, 11, 12, 13:
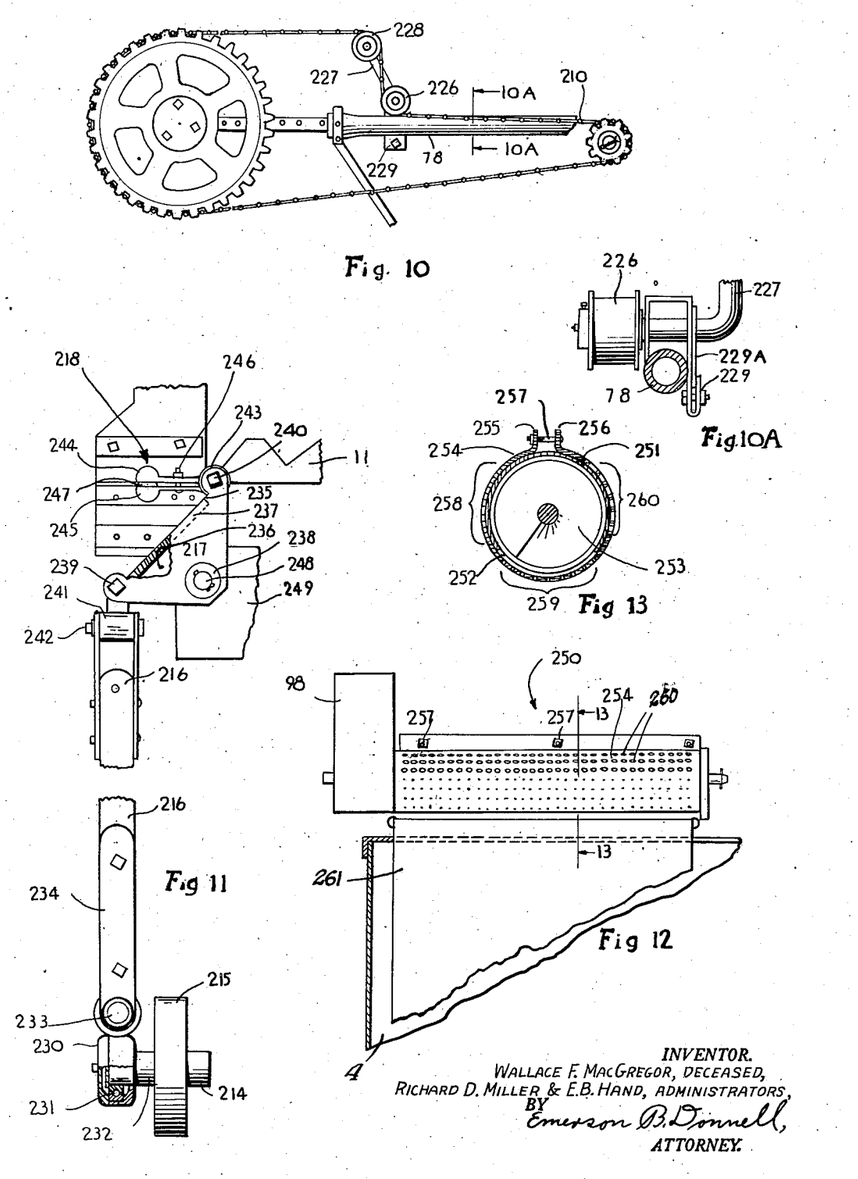
Fig. 10 is an elevation of a drive indicated in Fig. 2.
Fig. 11 is a plan view of a sickle drive indicated in Figs. 2 and 3.
Fig. 12 is an elevation of a weed screen attachment.
Fig. 13 is a sectional view taken on the line 13—13 of Fig. 12.

The variation in the sizes of sprockets 219, 209 and 220 requires an adjustment in the length of chain 210 and for this purpose a roller or other rotatable element 226, Figs. 10 and 10ª, is supported for rotation from arm 78. A support 227 pivotally mounted on arm 78 carries a roller 228, supported for rotation thereon, chain 210 passing in the present instance under roller 226 and over roller 228. Angular adjustment of support 227 accordingly adjusts the effective length of chain 210 to the proper tension regardless of the size of sprocket on shaft 208. Suitable means as a clamp 229 engaging a segment or the like 229ª fixed with support 227 is provided for maintaining the support in position.

Pitman 216 as seen in Fig. 11 has a bearing housing 230 carrying any suitable type of anti-friction bearing 231, engaging a crank pin 232 fixed in above mentioned crank member 215, housing 230 carrying a pivot 223 connecting the housing with a shaft portion 234 of the pitman.

Bell crank 217 may be of any suitable construction but in the present instance it is folded from a sheet of suitable material shaped to provide upper and lower generally triangular sections 235 and 236 joined by a web 237. At a point removed from web 237, a bearing element 238 is secured between sections 235 and 236, and pins 239 and 240 are secured between the sections at the remaining corners of the triangle. Pitman 216 is pivotally connected to pin 239 through a suitable universal arrangement, as for example, a bearing element 241 carrying a pin 242 connected with the pitman and journaled on pin 239. Pin 240 carries a bushing 243 of suitable material which may be yieldable in character, with which is engaged above mentioned link 218.

Link 218 comprises separable clamping units 244 and 245 clamped together by suitable means as a bolt 246 in intimate engagement with bushing 243 and also with a ball element or the like 247, fixed with sickle 11. Bushing 243 may yield sufficiently to reduce any hammering and to cushion the action of the sickle. Bearing element 238 embraces a fulcrum pin 248 inwardly displaced from pin 239 and rigidly mounted on a frame portion 249 extended from header 2. By virtue of the inward positioning of fulcrum pin 248, a very rigid mounting is provided, while avoiding excessive weight in the frame construction at this point. Also the outwardly directed link 218 provides for location of bell crank 217 close to the header while still allowing free action of the sickle.

Shaft 214, on which crank 215 is mounted, is located at the pivot point of header 2 relative to body portion 1, so that the range of movement of sickle 11 remains the same regardless of the adjustment of header 2 about shaft 214.

A modified type of auger conveyor generally designated as 250, Figs. 12 and 13, may be provided if desired, extending from above mentioned housing 98 and adapted to remove undesirable seeds from the cleaned grain. This auger conveyor includes a tubular portion 251 having a lower opening 252 within which is rotatively supported an auger 253. A perforated sleeve or shroud 254 encloses tube 251 and is preferably, although not necessarily, arranged to be clamped thereabout as by flanges 255 and 256 which may be forced toward each other as by bolts 257—257. Sleeve 254 may have a plurality of sets of perforations 258, 259 and 260, any one of which may be brought into register with opening 252 by rotating the sleeve about tube 251. The perforations may be of several sizes whereby they may be adapted to pass the weed seeds but not the grain being harvested. A receptacle 261 of any suitable form is secured within bin 4 beneath tube 251 to collect the seeds and prevent their mixing with the clean grain. In this way the seeds may be separated from the grain with the addition of very little mechanism over that already on the combine.

The operation of the machine is thought to be clear from the above description. Sufficient to say the draw bar element 8 is connected with a suitable tractor, the power take-off of which is connected to shaft 6. Member 8 is swung outwardly for harvesting and inwardly for transporting purposes, when harvesting the crop being cut by sickle 11 and traveling directly backwardly and upwardly toward the threshing mechanism. It is then gathered and condensed to the width of cylinder 30 by the beater-auger 20, between the cylinder and concave where the grain is threshed from the straw and separated therefrom in well-known manner. The clean grain is emptied into bin 4 by means of auger 47, elevator 93 and auger 99. When it is desired to empty bin 4, clutch 168 may be disengaged thereby preventing operation of all elements of the machine except shaft 166, auger 47, elevator 97 and auger 99. Auger section 103 is swung into position to form a continuation of auger 99 and valve 102 is opened. Upon starting of the power take-off, grain will then be discharged through chute 100, elevator 97, auger 99 and extension 103, into a waiting wagon or receptacle.

Reel 12 may be adjusted up or down or forward or back by releasing pins or latches 85 and 91, chain tightener 227 taking care of the adjustment of chain 210 to accommodate the difference in sprocket spacing. Likewise different size sprockets may be substituted on shaft 208 to obtain desired reel speeds, chain adjustment 227 providing the proper tension as in the case of shifting of the reel. The tailings are returned by an elevator 83 to auger-beater 24, and weed seeds are filtered out by the modified form of auger conveyor 250 when such operation is necessary.

The above being a complete description of an illustrative embodiment of the invention, what is claimed as new and desired to be secured by Letters Patent of the United States is:

1. A bin structure for a threshing means including an elevator mounted in fixed relation to said bin and at one side thereof for raising grain from the threshing means, and power driven conveying means extending from the top of the elevator to a point over the bin for filling the bin with grain from the elevator, comprising an auger conveyor having a casing, and a receptacle disposed beneath the casing within the bin, said casing being perforated for the escape of undesirable seeds into the receptacle prior to delivery of the grain from the conveyor into the bin.

2. A bin structure for a threshing means including an elevator mounted in fixed relation to said bin and at one side thereof, for raising grain to the bin, and power driven conveying means extending from the top of the elevator to a point over the bin for filling the bin with grain from the elevator, means for admitting grain from the bottom of the bin to the elevator for emptying the bin, and a power driven extension conveying means adapted for conveying grain completely across the bin and discharging it into a separate receptacle, said extension conveying means being disposed in driven relation to the first mentioned power driven conveying means and being removable from position on said first mentioned conveying means to provide for filling the bin.

3. A bin structure for a threshing means including an elevator disposed in fixed relation to the bin for raising grain to a point adjacent the top of the bin, driving means for the elevator and power actuated conveying means extending from the top of the elevator to a point over the bin for filling the bin with grain from the elevator, said driving means being adapted to actuate said power actuated conveying means, means for admitting grain from the bottom of the bin into the elevator for emptying the bin, and an extension conveying means driven from and hinged to the first mentioned conveying means for removal therefrom to provide for flow of grain from the first mentioned conveying means into the bin for filling the same.

4. A bin structure for a combine, including an elevator disposed in fixed relation to the bin for raising grain to a point adjacent the top of the bin, driving means for the elevator and an auger conveyor extending from the top of the elevator to a point over the bin for filling the bin with grain from the elevator, said driving means being adapted to actuate said auger conveyor, means for admitting grain from the bottom of the bin to the elevator for emptying the bin, and an extension auger conveyor hinged to the first mentioned auger conveyor and adapted to convey grain completely across said bin to a point of discharge outside of said bin, and said extension auger conveyor being removable by virtue of its hinged connection to provide for flow of grain from the first mentioned auger conveyor to the bin for filling the same.

RICHARD D. MILLER,
E. B. HAND,
*Administrators of the Estate of Wallace F. MacGregor, Deceased.*